March 18, 1958
W. E. KENNEL ET AL
2,827,503
RECOVERY OF PARA-XYLENE FROM SOLUTIONS
CONTAINING THE XYLENE ISOMERS
Filed May 1, 1953
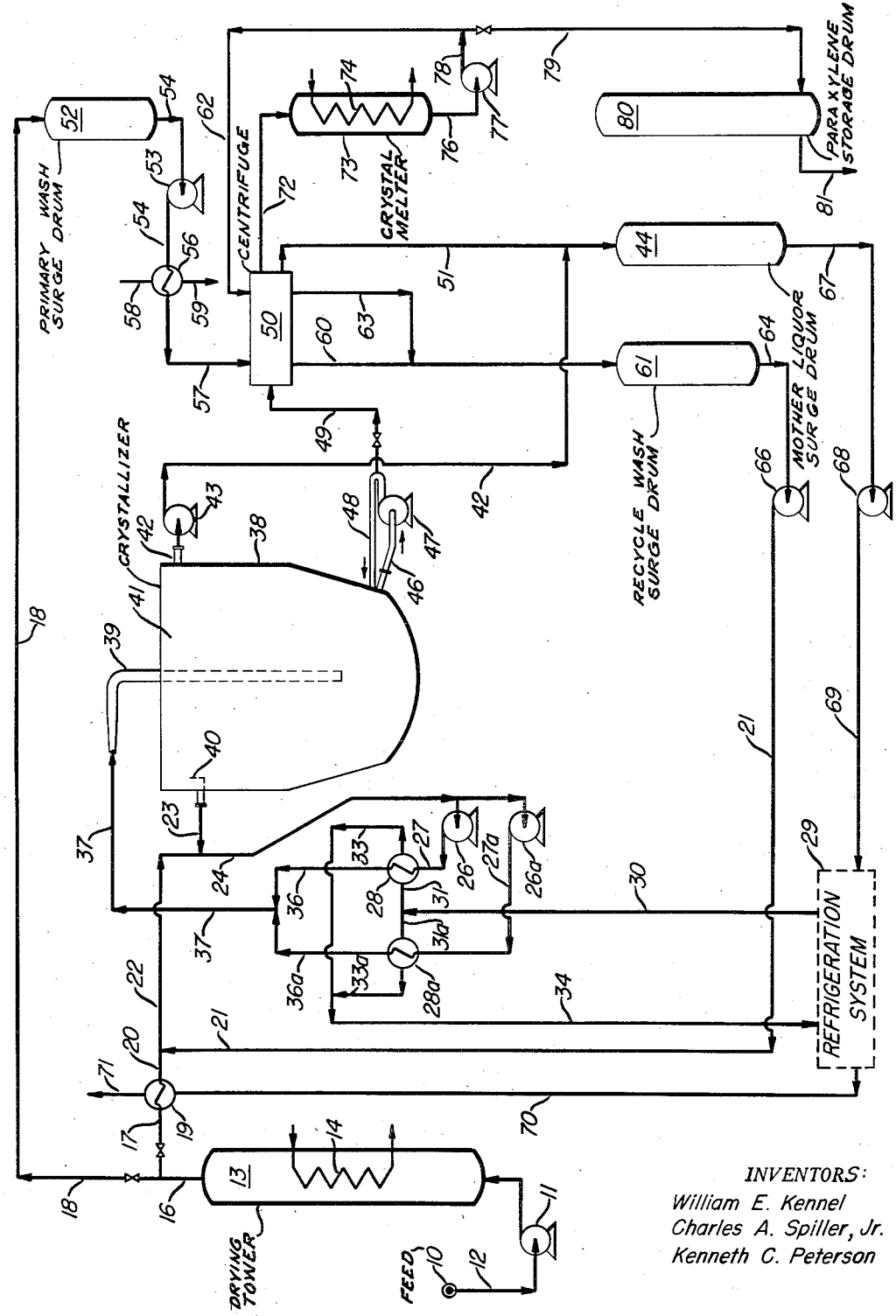
INVENTORS:
William E. Kennel
Charles A. Spiller, Jr.
Kenneth C. Peterson

United States Patent Office 2,827,503
Patented Mar. 18, 1958

2,827,503

RECOVERY OF PARA-XYLENE FROM SOLUTIONS CONTAINING THE XYLENE ISOMERS

William E. Kennel, Munster, Ind., Charles A. Spiller, Jr., Chicago, Ill., and Kenneth C. Peterson, Hammond, Ind., assignors to Standard Oil Company, Chicago, Ill., a corporation of Indiana Application May 1, 1953, Serial No. 352,364

6 Claims. (Cl. 260—674)

This invention relates to the separation and recovery of paraxylene from mixtures of its isomers and other hydrocarbons boiling within substantially the same temperature range. The invention has more particular reference to an improved method for the recovery of paraxylene from such crude mixture by fractional crystallization.

Para-xylene has been separated from crude mixtures, especially mixtures derived from coke-oven light oil or reformed petroleum stocks, by a fractional crystallization either of the entire mixture or of a distillate overhead recovered from intensive fractional distillation of ortho-xylene from the feed stock. An increased industrial demand for para-xylene, for example in the manufacture of terephthalic acid, has increased the need for a method which will avoid the use of intricate apparatus or the recovery of only fractional yields of para-xylene and will economically provide improved yields of para-xylene.

The object of the present invention is a provision of improved method and means for the recovery of refined para-xylene. Another object of the invention is the provision of a process for the recovery of para-xylene in a single separation step from crude solutions thereof containing also substantial quantities of ortho- and meta-xylene, ethylbenzene and non-aromatics. Yet another object of the invention is to provide a method suitable for industrial-scale operation for the recovery of substantially the entire theoretically possible yield of para-xylene from crude mixtures thereof while avoiding heretofore encountered operational difficulties. The invention has for other objects such other advantages or results as will be found in the specification and claims.

While described in more detail with reference to the accompanying drawing, the present invention, briefly stated, comprises an improved method and means for the recovery of para-xylene from crude mixtures thereof wherein a dried feed is precooled to a temperature between about 0° and —80° F., and preferably above —65° F. (to avoid crystal deposition in the precooler) and is subsequently admixed with a relatively large volume of liquid recycled from the crystallizing zone, which may or may not contain appreciable amounts of crystals; wherein the mixture is cooled indirectly in high-velocity, low temperature-differential coolers; wherein the para-xylene is crystallized at a temperature between —120° and —130° F. in a crystallizing vessel having an uppermost zone from which mother liquor is decanted, an intermediate zone from which said recycle stream is withdrawn at a rate equivalent to 50 to 150 times the rate of feed input, and a lowermost zone from which a crystal slurry is withdrawn. Cold mother liquor can be used to cool refrigerant in the refrigeration system. The recycle stream from the crystallization zone preferably is mixed with a precooled stream of fresh feed and a liquid recycled from the crystal washing zone; the total stream is passed at a rate between about 2500 and 5000 gallons per minute through indirect coolers in which a ΔT between the refrigerant and the liquid is no greater than about 5° to 8° F. and in which the circulating liquid is cooled to a temperature preferably between about —120° F. and —125° F. The unusually low temperature of operation provides a maximum yield of para-xylene by separating substantially all of the para-xylene down to the spontaneous crystallization temperature of the second component, usually ortho-xylene, of the crude mixture.

Product slurry is preferably centrifuged for the separation of mother liquor and is washed, preferably with a warm stream of feed stock. A secondary wash of the crystals employs a portion of melted para-xylene; this para-xylene-rich wash liquid, after passing through the crystals, can be recycled to the crystallization step. Our method will provide a product from usual hydroformer xylene fractions, that is between about 97.5% and 99% pure. The product crystals can be melted and then be delivered to storage or further processing. For example, the para-xylene product can subsequently be treated with a purifying liquid, e. g., toluene sulfonic acid, for further and substantially complete purification of the para-xylene.

The mixtures from which para-xylenes can be recovered by the present process must contain at least about 10% para-xylene and can contain from about 5 to 20% ortho-xylene, 15 to 50% meta-xylene, 5 to 40% ethylbenzene, and 1 to 20% non-aromatics. The temperature to which the feed liquors to the crystallizer of the present process should be cooled to obtain maximum para-xylene recovery can be readily determined as the minimum temperature or that which is just above the spontaneous crystallization temperature of the first crystallizing component other than para-xylene in the mixture. Hydroformer xylene fractions will contain the xylene isomers in an equilibrium ratio that is somewhere between 1:1:2 to 2:3:5 mols, respectively of para- to ortho- to meta-xylene. Feed stocks of this character especially when containing at least about 15% ethylbenzene should be cooled to a temperature between about —120° and —130° F. in order to recover a maximum yield of para-xylene crystals.

The drawing is a schematic flow diagram of a process for fractional crystallization of para-xylene.

A typical example of operation is described with reference to the drawing, for the purpose of more clearly defining the present invention. A feed stock containing about 85% C₈ aromatics and having an average composition substantially as follows: para-xylene 13%, ortho-xylene 17%, meta-xylene 33%, ethylbenzene 23%, other aromatics 4% and paraffins 10%, is pumped from a source 10 at a rate of about 3800 gallons per hour by pump 11 through line 12 into a drying tower 13 which contains a solid desiccant such as activated alumina or silica gel and is provided with suitable means for regenerating the desiccant such as steam coil 14. The dried feed stock flows from line 16 to juncture with valved lines 17 and 18.

A portion of the feed is directed through the valved line 17 at a rate of 3050 gallons per hour through precooler 19 wherein the feed is precooled by indirect heat exchange with cold mother liquor to a temperature of about —53° F. Feed flows from the precooler 19 through line 20 and is mixed in line 22 with recycled cake wash liquid flowing from line 21. The mixed feed stream in line 22 flows therethrough at a rate of about 4000 gallons per hour at a temperature of —38° F. and in the present example contains approximately 16% para-xylene. The mixture flowing in line 22 is mixed with recycle liquor from line 23 and flows from the juncture of said lines 22 and 23 through line 24.

The feed mixture including the added recycle liquor flows through line 24 at a rate of about 180,000 gallons per hour and is pumped by parallel pumps 26 and 26a from the line 24 through lines 27 and 27a, in which are disposed, respectively, the pumps 26 and 26a, into parallel coolers 28 and 28a. Refrigerant flows from a refrigeration system 29 through line 30 and lines 31 and 31a into, respectively, coolers 28 and 28a and into indirect contact in the coolers with the feed liquor. Refrigerant is introduced into the coolers at a temperature of about −126° F. and cools by indirect heat exchange the feed liquors to a temperature of −121° F., or slightly lower. Refrigerant vapor flows from the coolers 28 and 28a through lines 33 and 33a and thence through line 34 in return to the refrigeration system 29.

Feed liquors consisting of crude xylenes mixture and recycled liquors flow from the coolers 28 and 28a through parallel cooler outlet lines 36 and 36a, which lines join to form line 37. The feed liquor flows through line 37 to crystallizer 38.

The feed liquor is introduced into the crystallizer 38 through down pipe 39 that is about 2 feet in diameter and extends into the crystallizer 38 from the top thereof downwardly along the longitudinal axis of the crystallizer to a point approximately 6 feet from the bottom of the crystallizer, which in the present example has an overall height of about 20 feet. The crystallizer 38 consists of an enclosed and insulated round bottomed cylindrical vessel that is approximately 18 feet in diameter, the upper portion of the crystallizer being about 10′ in depth, the tapered lower section being about 8′ in depth and the remainder of the length of the crystallizer consisting of a round bottomed section that is about 14 feet in diameter. The feed liquor which is introduced through the said pipe 39, having been cooled to the low temperature of about −121° F. or slightly less, is supersaturated with respect to para-xylene. This liquid flows upwardly through the bed of crystals suspended in the vessel and the supersaturation is released both by crystallization of para-xylene on the crystals existent in the bed and by formation of new crystals. The larger crystals settle slowly against the upflowing liquid and accumulate in the bottom of the crystallizer. Recycle liquor which can contain finely divided crystals but will be substantially free of the larger crystals is withdrawn from the crystallizer through trap 40 and line 23 and will be recycled through the line 24 to coolers 28 and 28a and feed line 37 in the manner hereinbefore described. An approximately 3½ feet depth of liquid is maintained above the outlet trap 40 and this uppermost portion of the mass of liquid in the crystallizer 38 constitutes a settling zone in which the final result of classification and settling of crystals are accomplished.

Mother liquor is withdrawn from the settling zone 41 of the crystallizer 38 through outlet line 42 by means of pump 43 disposed therein, and is flowed at a rate of about 2100 gallons per hour through the line 42 to motor liquor surge drum 44. The so-withdrawn mother liquor contains about 6% para-xylene, about 83% other aromatics and about 10% non-aromatics. A mother liquor surge drum in the present example has a capacity of about 750 gallons and the liquor therein is at a temperature of about −121° F.

A relatively concentrated slurry consisting of about 20% by weight of para-xylene crystals is pumped at a constant rate from the bottom of the crystallizer 38 through line 46 by means of pump 47 at a rate sufficient to properly feed the intermittently-operated centrifuges and at the same time to prevent settling of crystals in said line 46. Slurry not required as feed to the plurality of centrifuges represented by centrifuge 50 is recycled to the crystallizing vessel through line 48. The agitation provided by the recycle will also prevent any adherence of crystals to, or agglomeration in, the bottom of the crystallizer. Centrifuge 50 is first operated to effect a separation of mother liquor from a resulting cake of para-xylene crystals and the mother liquor so extracted from the crystals flows through a line 51 from the centrifuge to the mother liquor surge drum 44.

The cake of para-xylene crystals in the centrifuge 50 is first washed with a portion of the dried liquid feed, which portion flows from line 18 through a primary wash surge drum 52 from which it is pumped by pump 53 in line 54 at a rate of about 750 gallons per hour through indirect heater 56. The feed is warmed in the heater 56 to a temperature of about 80° F. and is thence passed through line 57 into the centrifuge. The heater 56 is supplied with low pressure steam line having inlet 58 and outlet 59. This primary wash liquid is separated by centrifuging from the crystal cake in centrifuge 50 and is withdrawn from the centrifuge 50 through line 60 at a temperature of about −10° F. and flows through the line 60 at a rate of about 840 gallons per hour into a recycle wash surge drum 61. The primary wash liquid which has increased in volume through a partial melting of crystals in the centrifuge 50 as the temperature is raised and a removal of mother liquor from the surface of the crystals therein has a para-xylene content of about 20%.

A secondary wash liquid that is obtained by melting para-xylene product is flowed through line 62 at a rate of 80 gallons per hour and at a temperature of about 60° F. into the centrifuge wherein it is employed to further raise the temperature and wash the para-xylene crystal cake. This secondary wash liquid is withdrawn from the centrifuge through line 63 and is mixed with primary wash liquid in line 60. The secondary wash liquid is withdrawn from the centrifuge at a rate of about 115 gallons per hour at a temperature of 40° F. Here again the increase in volume of outlet wash liquids over inlet wash liquid is caused by the melting of crystal cake that is effected in the centrifuge. The secondary wash liquid contains about 79% by volume of para-xylene. The mixed wash liquids which flow from line 60 into the recycle wash surge drum 61 are withdrawn therefrom at a temperature of about 0° F., the resultant mean temperature of the mixed wash liquids, at a rate of about 958 gallons per hour through line 64. The withdrawn wash liquids are pumped by pump 66 through line 21 into the line 22 in which it mixes with precooled feed.

The mother liquor is pumped from surge drum 44 through line 67 by pump 68 and through line 69 into the refrigeration system 29 at a rate of about 3500 gallons per hour at a temperature of −105° F. The mother liquor is employed in indirect heat exchange in the refrigeration system for cooling purposes. This mother liquor in which the para-xylene content has been reduced, with respect to the feed to about 5% by volume is flowed from the refrigeration system 29 at a temperature of about −65° F. through a line 70 and through precooler 19 in indirect heat exchange with feed. Mother liquor from the precooler 19 flows through line 71 at a temperature of about 70° F. to storage or to divers means for the extraction of other valuable constituents of the liquor.

Para-xylene crystals are discharged from the centrifuge 50 and are moved along the line indicated by 72 at a rate of about 57 cu. ft. per hour into a melter 73 that is supplied with conventional steam coil 74. The para-xylene melt is pumped from the melter 73 through line 76 by pump 77 and through line 78 at a rate of about 395 gallons per hour. The liquid in this example has a para-xylene content of 98.3%. Para-xylene flows from line 78 through valved line 79 into storage drum 80 at a rate of about 315 gallons per hour. This para-xylene can be passed from the drum 80 through line 81 to means (not shown) for further purifying the para-xylene, e. g., toluene sulfonic acid treating.

By employing our method and means we can cool para-xylene feed stocks in the large-scale fractional crystallization of para-xylene to temperatures closely approaching the spontaneous crystallization temperature of the next saturated component of the stock and thereby obtain maximum yields of para-xylene without encountering substantial operating difficulties. This beneficial result is accomplished by careful operation of the crystallizer, by recycling crystal slurry through cooling apparatus at such a rate and at such a limited temperature differential that plugging in the cooler lines in avoided, and by maintaining the obtained crystal slurry in a dispersion in the mother liquor. Our process provides for the separation of a substantial quantity of the mother liquor in the crystallizer itself; this separation of mother liquor by settling is a beneficial element of our combination because it relieves some of the load on the centrifuges. Crystal growth, during the settling, produces larger crystals which can be readily separated from mother liquor and which, having less surface, will require less washing to remove surface mother liquor. The foregoing features and other elements of the process in combination provide our improved method of recovering para-xylene from crude xylene mixtures, and particularly from hydroformer xylene fractions.

Having described our invention, we claim:

1. A process of crystallizing para-xylene from a crude xylenes mixture containing at least 10% of para-xylene and substantial quantities of ortho- and meta-xylene, ethylbenzene and non-aromatics which comprises circulating cold xylenes liquor between a refrigerated cooling zone and a crystallizing vessel having an uppermost zone from which mother liquor is decanted, an intermediate zone from which the circulating liquor is withdrawn and a lowermost zone from which a crystal slurry is withdrawn; precooling the crude xylenes charge mixture; admixing the precooled charge mixture with the circulating cold xylenes liquor at a rate providing a rate ratio of cold xylenes liquor 50 to 150 times the rate of charge input; cooling the resulting mixture without substantial crystallization to a temperature which is just above the spontaneous crystallization temperature of the first crystallizable component other than para-xylene and between —120° F. to —130° F.; crystallizing para-xylene from said cooled mixture in the crystallizing vessel; decanting mother liquor from the uppermost zone of the crystallizing vessel bringing cool mother liquor into indirect contact with warm compressed refrigerant in the refrigeration zone; passing mother liquor from the refrigeration zone into indirect contact with freshly introduced crude xylenes mixture and effecting said precooling of the crude xylenes mixture to a temperature not below about —80° F.; and withdrawing a para-xylene rich slurry from the lowermost zone of the crystallizing vessel.

2. The process of claim 1, in which cooled and recycled crystalizing liquor is introduced into a crystallization zone at a point within and near the bottom of the said zone and in which crystallizing liquor rises countercurrently to the formed crystals which have an average downward direction.

3. The process of claim 1 in which mother liquor rises upwardly from the crystallization zone into a settling zone from which para-xylene crystals settle and mother liquor is withdrawn.

4. The process of claim 1 which includes centrifuging the withdrawn slurry of para-xylene crystals to remove mother liquor and form a crystal cake, washing the crystal cake with fresh feed at a higher temperature than the temperature of the cake and displacing, with so-formed melted para-xylene, adherent mother liquor from the crystals of the cake.

5. The process of claim 4 which process includes washing para-xylene crystals, subsequent to their washing with feed, with a secondary wash liquid consisting of melted para-xylene.

6. A process of crystallizing para-xylene from a crude xylenes mixture containing at least 10% of para-xylene and substantial quantities of ortho- and meta-xylene, ethylbenzene and non-aromatics which comprises circulating cold xylenes liquor between a refrigerated cooling zone and a crystallizing vessel having an uppermost zone from which mother liquor is decanted, an intermediate zone from which the circulating liquor is withdrawn and a lowermost zone from which a crystal slurry is withdrawn; precooling the crude xylenes charge mixture; admixing the precooled charge mixture with the circulating cold xylenes liquor at a rate providing a rate ratio of cold xylenes liquor 50 to 150 times the rate of charge input; bringing the so-formed mixture of xylenes liquors into indirect contact with a cold refrigerant liquid that is less than 8° F. cooler than the said mixture and cooling the mixture to a temperature that is just above the spontaneous crystallization temperature of the first crystallizable component other than para-xylene and between —120° F. to —130° F.; crystallizing para-xylene from said cooled mixture in the crystallizing vessel; decanting mother liquor from the uppermost zone of the crystallizing vessel; bringing cool mother liquor into indirect contact with warm compressed refrigerant in the refrigeration zone; passing mother liquor from the refrigeration zone into indirect contact with freshly introduced crude xylenes mixture and effecting said precooling of the crude xylenes mixture to a temperature not below about —80° F., and withdrawing a para-xylene-rich slurry from the lowermost zone of the crystallizing vessel.

References Cited in the file of this patent

UNITED STATES PATENTS

| 2,438,368 | Keeling | Mar. 23, 1948 |
| 2,540,977 | Arnold | Feb. 6, 1951 |
| 2,541,682 | Arnold | Feb. 13, 1951 |
| 2,672,487 | Tegge et al. | Mar. 16, 1954 |
| 2,683,178 | Findlay | July 6, 1954 |
| 2,688,045 | Powers et al. | Aug. 31, 1954 |

OTHER REFERENCES

Perry Chemical Engineers Handbook, McGraw-Hill Book Co. (1950), third ed., page 1068.